United States Patent Office 2,938,903
Patented May 31, 1960

2,938,903

NEW HETEROCYCLIC PARAQUINONES

Richard J. Boyle, Neshanic, N.J., assignor to American Cyanamid Company, New York, N.Y., a corporation of Maine No Drawing. Filed Apr. 4, 1958, Ser. No. 726,345

11 Claims. (Cl. 260—256.4)

This invention relates to new quinones, and more specifically, it relates to new 1,4-quinones of a heterocyclic ring system represented by the following formula:

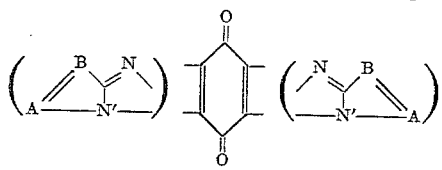

in which B, when not carbon, is nitrogen, and A is the residue of an aromatic ring system of less than three six-membered rings in which N' and B, when B is nitrogen, are the only hetero atoms.

In the above structure, the compound is written indefinitely, because from the method of preparation it is not possible to determine whether the compound formed (e.g., from 2-aminopyridine) is a cis compound of the structure:

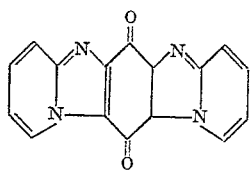

or a trans compound of the structure:

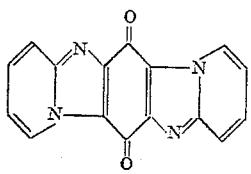

or mixtures of the two. From various properties of the products, I believe that there is formed principally the trans isomer, and the compounds will be given this structure in the discussion and the examples given below. This structure is named (for the pyridine derivative) as a 6,13-dione of 6(H), 13(H)-dipyrido[1',2'-a,1'',2''-a'] - benzo - [1,2-d,4,5-d'] - bis-imidazole, or in more abbreviated fashion, as quinone-bis-pyridoimidazole.

The compounds of my invention are new colored compounds which may be used as vat dyes in the ordinary manner. They are prepared by the treatment of a 2-amino-pyridine, quinoline or pyrimidine with chloranil (2,3,5,6-tetrachloro-para-benzoquinone) by heating the reactants in an organic solvent. Suitable organic solvents include such solvents as ethanol, methanol, Cellosolve, and the like.

Substituents are introduced into the new quinones of my invention by the use of the properly substituted 2-aminopyridine, quinoline or pyrimidine. Examples of the 2-aminopyridines, quinolines, and pyrimidines which may be used in the preparation of these new quinones, are:

2-aminopyridine
2-amino-3-methylpyridine
2-amino-4-methylpyridine
2-amino-5-methylpyridine
2-amino-6-methylpyridine
2-amino-5-chloropyridine
2-amino-4,6-dimethylpyridine
2-amino-5-nitropyridine
2-amino-3-bromopyridine
2-amino-4-bromopyridine
2-amino-5-bromopyridine
2-amino-6-chloropyridine
2-amino-3-chloro-5-nitropyridine
2-amino-3,4-dibromopyridine
2-amino-3,5-dibromopyridine
2-amino-5-iodopyridine
2-amino-5-bromo-3-nitropyridine
2-amino-6-chloro-3-phenylpyridine
2-amino-4-ethylpyridine
2-amino-6-bromopyridine
2-amino-3-iodopyridine
2-amino-4-iodopyridine
2-amino-6-ethoxypyridine
2-amino-5-ethoxypyridine
2-amino-3,5-dinitropyridine
2-amino-3,5-dichloropyridine
2-amino-3,4-dichloropyridine
2-amino-4-chloropyridine
2-amino-3-chloropyridine
2-amino-3,5-diiodopyridine
2-aminoquinoline
2-amino-8-ethoxyquinoline
2-amino-3-phenylquinoline
2-amino-6-methylquinoline
2-amino-8-methylquinoline
2-amino-6-methoxy-3-phenylquinoline
2-amino-8-methoxy-3-phenylquinoline
2-aminopyrimidine
2-amino-4-methylpyrimidine
2-amino-4-isobutylpyrimidine
2-amino-4-ethylpyrimidine
2-amino-4-ethoxypyrimidine
2-amino-4-amylpyrimidine
2-amino-4-methyl-5-amylpyrimidine
2-amino-4-chloropyrimidine
2-amino-4-butylpyrimidine
2-amino-4-t-butylpyrimidine
2-amino-5-chloropyrimidine
2-amino-5-chloro-4,6-dimethylpyrimidine
2-amino-6-ethoxypyrimidine
2-amino-6-ethylpyrimidine
2-amino-4,6-diethylpyrimidine
2-amino-4,6-diiodopyrimidine
2-amino-4-methoxypyrimidine
2-amino-4-hexylpyrimidine
2-amino-4-methyl-5-ethylpyrimidine
2-amino-4,6-diphenylpyrimidine
2-amino-4,6-dipropoxypyrimidine
2-amino-4-chloro-6-methylpyrimidine
2-amino-4,6-dichloropyrimidine
2-amino-4,6-dimethylpyrimidine Thus, the group A can be the residue of a pyridine, a quinoline, or a pyrimidine which carried a primary amino nitrogen in the 2-position at the start.

In the preparation of these new compounds, it is convenient usually to use at least a mole excess of 2-aminopyridine in order that the excess may act as an acid acceptor. Alternatively, another acid accepting compound may be used as the solvent, for example, dimethyl aniline, or another acid acceptor may be added to the reaction mixture, such as sodium carbonate, calcium carbonate, and the like.

My invention may be further illustrated by the following examples in which parts are by weight unless otherwise specified.

Example 1

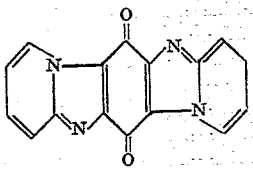

A mixture of 24.6 parts of chloranil, 37.6 parts of 2-aminopyridine and 130 parts of ethanol is heated at the reflux temperature with stirring until the reaction is substantially complete. The mixture is then cooled in an icebath. The solid material which forms is removed by filtration and washed thoroughly with alcohol. Recrystallization of the crude product from nitrobenzene gives the pure reddish-brown quinone.

Example 2

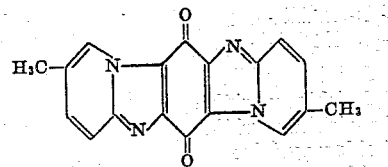

A mixture of 12.3 parts of chloranil, 22.6 parts of 2-amino-5-methylpyridine and 80 parts of ethanol is heated with stirring at the reflux temperature until the reaction is substantially complete. The mixture is then allowed to cool to room temperature. The solid which precipitates is removed by filtration. Recrystallization from nitrobenzene gives the pure cinnamon brown colored quinone, which dyes cotton a reddish yellow shade from a claret vat.

Similarly, if 2-amino-3-methylpyridine, 2-amino-4,6-dimethylpyridine, 2-amino-4-bromopyridine, or 2-amino-6-ethoxypyridine are used in equivalent quantities, the correspondingly substituted product is obtained.

Example 3

A mixture of 1 part of the product of Example 2, 3 parts of sodium hydrosulfite and 100 parts of water containing 10 parts of 24% sodium hydroxide solution, is heated at 140° F. for 20 minutes. The mixture is then diluted with 200 parts of water at 140° F., and a skein of cotton is immersed in the dye bath. After remaining in the bath 45 minutes at this temperature, the skein is removed, air-oxidized, soaped, rinsed and dried. The cotton is dyed reddish yellow.

Example 4

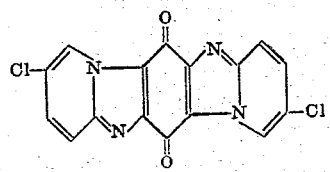

The procedure of Example 2 is followed using an equivalent quantity of 2-amino-5-chloropyridine in place of the aminomethylpyridine. Similarly, 2-amino-5-bromopyridine and 2-amino-5-iodopyridine give the corresponding bromo and iodo compounds.

Example 5

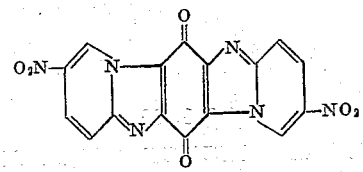

The procedure of Example 2 is followed, using an equivalent quantity of 2-amino-5-nitropyridine in place of the aminomethylpyridine. Similarly, the use of an equivalent quantity of 2-amino-3,5-dinitropyridine gives the corresponding tetranitro compound.

Example 6

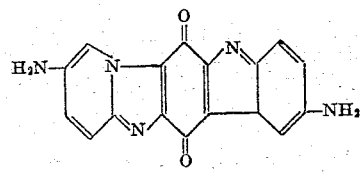

The product of Example 5 is added slowly to a refluxing solution of 5% sodium sulfide. The solid product is isolated by filtration.

The diamine can be diazotized and the amino group replaced by cyano, using the Sandmeyer reaction, after which the cyano groups can be hydrolyzed by dilute acid to carboxamido groups and by dilute alkali to carboxylic acid groups.

Similarly, the Sandmeyer reaction can be used to replace the amino groups with mercapto groups (through the xanthate) which can be alkylated to alkylsulfides (e.g., dimethyl sulfate gives methylmercapto—which can be oxidized to methyl sulfonyl) or can be oxidized with strong oxidizing agents to sulfonic acid groups.

Example 7

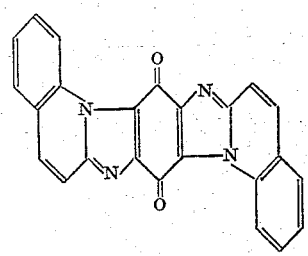

The procedure of Example 1 is followed using an equivalent quantity of 2-amino-quinoline in place of the 2-aminopyridine, to give the above product. Similarly, the use of an equivalent quantity of 2-amino-8-ethoxyquinoline, 2-amino-3-phenylquinoline, or 2-amino-6-methoxy-3-phenylquinoline gives the correspondingly substituted products.

Example 8

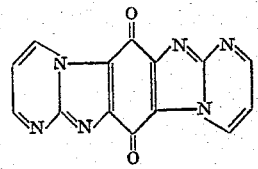

The procedure of Example 1 is followed using an equivalent quantity of 2-aminopyrimidine in place of the 2-aminopyridine. When 2-amino-4-methylpyrimidine, 2-amino-5-chloro-4,6-dimethylpyrimidine, 2-amino-5-chloropyrimidine, 2-amino-4,6-diiodopyrimidine, or 2-amino-4,6-diphenylpyrimidine is used instead, the correspondingly substituted product is obtained.

I claim:
1. A compound of the formula

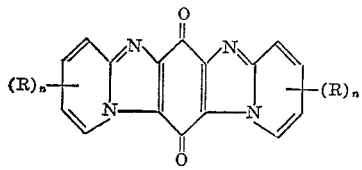

in which n is selected from the group consisting of 0, 1 and 2 and in which R is selected from the group consisting of lower alkyl, lower alkoxy, chloro, bromo, iodo, phenyl, nitro, amino, cyano, carboxamido, carboxy, sulfo and mercapto.

2. A compound of the formula

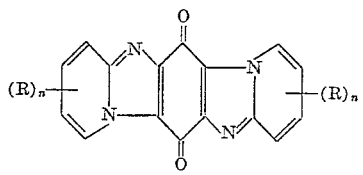

in which n is selected from the group consisting of 0, 1, and 2 and in which R is selected from the group consisting of lower alkyl, lower alkoxy, chloro, bromo, iodo, phenyl, nitro, amino, cyano, carboxamido, carboxy, sulfo, and mercapto.

3. A compound of the formula

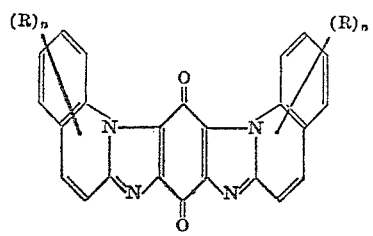

in which n is selected from the group consisting of 0, 1 and 2 and in which R is selected from the group consisting of lower alkyl, lower alkoxy and phenyl.

4. A compound of the formula

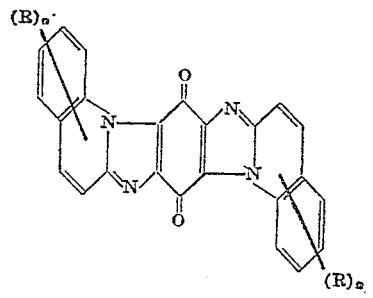

in which n is selected from the group consisting of 0, 1 and 2 and in which R is selected from the group consisting of lower alkyl, lower alkoxy and phenyl.

5. A compound of the formula

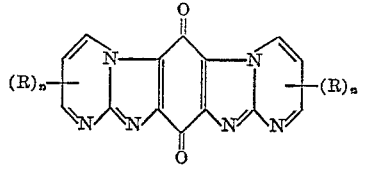

in which n is selected from the group consisting of 0, 1, 2 and 3 and in which R is selected from the group consisting of lower alkyl, lower alkoxy, phenyl, chloro and iodo.

6. A compound of the formula

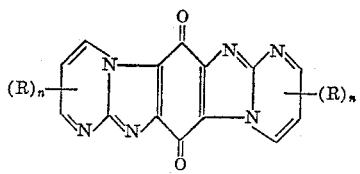

in which n is selected from the group consisting of 0, 1, 2 and 3 and in which R is selected from the group consisting of lower alkyl, lower alkoxy, phenyl, chloro and iodo.

7. The compound:

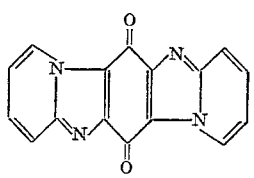

8. The compound:

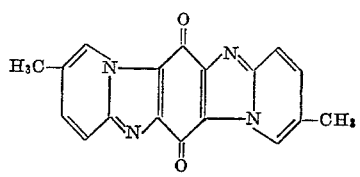

9. The compound:

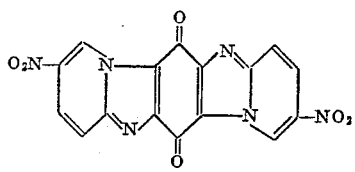

10. The compound:

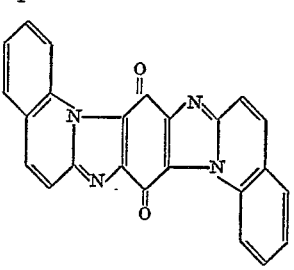

11. The compound:

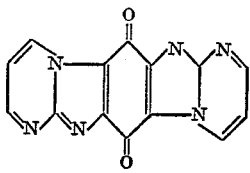

No references cited.